United States Patent [19]

Lewison

[11] 4,185,699

[45] Jan. 29, 1980

[54] SOIL CONTACT TOOL

[75] Inventor: Howard L. Lewison, Hutchinson, Minn.

[73] Assignee: Dynamics Corporation of America, Greenwich, Conn.

[21] Appl. No.: 894,362

[22] Filed: Apr. 7, 1978

[51] Int. Cl.$^2$ .......................................... A01B 39/20
[52] U.S. Cl. .................................. 172/724; 172/732
[58] Field of Search ............... 172/700, 705, 713, 721, 172/722, 724, 730, 732, 733

[56] References Cited

U.S. PATENT DOCUMENTS

| | | | |
|---|---|---|---|
| 346,064 | 7/1886 | Potts | 172/724 |
| 395,573 | 1/1889 | Mallory | 172/724 |
| 418,389 | 12/1889 | Stephens | 172/722 |
| 790,746 | 5/1905 | Pearce et al. | 172/724 |
| 1,099,765 | 6/1914 | Poole | 172/724 |
| 1,205,416 | 11/1916 | Trout | 172/724 X |
| 1,656,133 | 1/1928 | Bass | 172/724 |
| 2,779,263 | 1/1957 | Franz et al. | 172/724 |
| 3,762,483 | 10/1973 | Meiners | 172/700 |

*Primary Examiner*—Richard T. Stouffer
*Attorney, Agent, or Firm*—Schroeder, Siegfried, Ryan, Vidas, Steffey & Arrett

[57] ABSTRACT

This invention relates to an improved soil contact tool comprised of a narrow uniform width ground engaging section and a triangular moldboard section extending therefrom. The moldboard section has a center to direct soil away from the mold board with sides being generally concave to insure transverse movement of the soil to create ridges on either side of the ground working tool.

8 Claims, 5 Drawing Figures

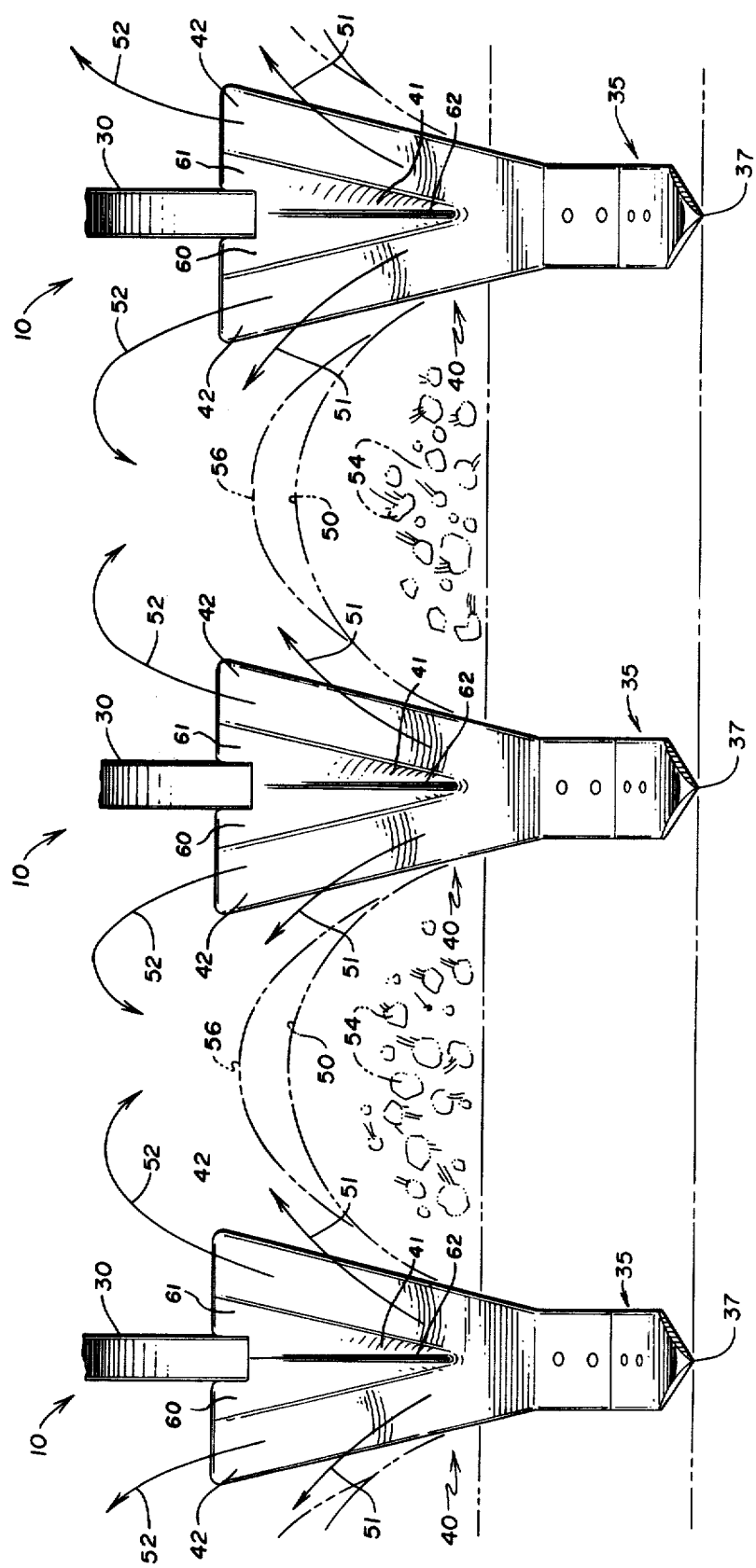

SOIL CONTACT TOOL

FIELD AND BACKGROUND OF INVENTION

My invention relates to a soil contact tool and more particularly to an improved tillage tool which is designed to work the soil and to raise and direct worked soil to either side of the tool in a cultivating operation.

In the past, tillage tools of the contact type have taken a variety of forms. Such tools are designed to break up and turn over compacted soil preparatory to furrowing and conditioning of the soil preceding planting. Tillage tools of this type will generally be mounted in a ganged relationship on a drawn type tillage implement. Conventionally, tools may take the form of a broad blade or shovel designed to move beneath the surface of the compacted soil to loosen the same. Similarly, the tool may be a curved chisel type implement which works the soil or loosens it but does not displace the same. More recently, a tool of this latter type having a generally helical form has been placed on the market. It is designed to loosen and raise the soil to one side of the area being worked. The problem with a plurality of these tools in a ganged relation is that they do not provide uniform displacement of the soil, and they fail to adequately cover any residue left on the surface of the soil from the previous plantings. With such prior tillage tools, further tillage operations are necessary to condition the soil for planting.

In addition to such primary tillage type tools, there are furrowing type tools designed to work on previously worked or loosened soil for the purpose of creating a furrow therein preparatory to planting. Such a tool merely displaces the soil by creating the furrow. None of the prior structures in soil contact tools simultaneously perform a deep digging operation which disturbs and loosens the soil and at the same time moves the soil transversely to the sides of the tool to cover up old crop residue in a single soil cultivation. This type of tool operation is necessary for better decomposition of the residue and moisture retention of the soil preparatory to preplant and planting operations.

SUMMARY OF THE INVENTION

The present invention is directed to an improved soil contact tool for primary tillage work. It is particularly adapted for use on shank type tillage machinery having tool mounting shanks thereon. The soil contact tool is a composite tool formed of a flat, narrow, uniform width ground engaging section known as a point and having a pointed extremity. The ground engaging section connects with a triangular shaped moldboard section positioned above the ground engaging section on the tool shank. The moldboard section has a triangular shaped center portion which has a raised or generally convex center to direct soil away from the same. On each side of the center portion are side portions which have a generally concave surface. The composite tool may be formed as a separate point and moldboard part or as a single unit. These parts may be supported on a generally narrow base which mounts and secures the parts to a curved shank. The composite tool is generally curved to be positioned forward of and with generally the same curvature as the tool mounting shank. The narrow ground engaging section acts as a chisel type tool in disturbing the soil, and the triangular moldboard section is generally placed at or near the ground level so as to receive the raised soil and direct the same to the sides of the tool as it is drawn through the soil. This will create ridges of the soil and any residue on the surface will mix with the soil for the purpose of accelerating decomposition of any old crop residue and to remove the same from areas of new planting. Further, the ridges created by the soil and residue reduce soil erosion and absorb and store a maximum amount of moisture to be used in the following crop. The improved soil contact tool provides a maximum of soil working or loosening the soil and conditions the surrounding soil for earliest preplant and planting operations while combining the conventional tillage methods with a minimum of tillage for soil conservation purposes.

DESCRIPTION OF THE DRAWINGS

FIG. 5 is a schematic front view of the plurality of the soil contact tools showing the operation of the same.

DESCRIPTION OF THE PREFERRED EMBODIMENT

Figure 1:
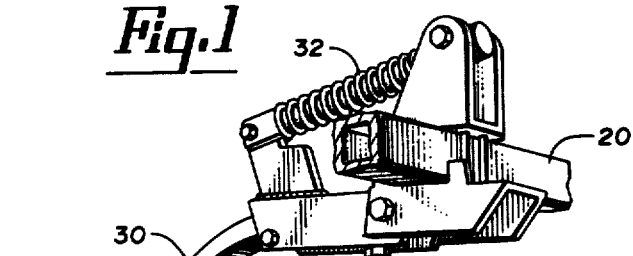
FIG. 1 is a perspective view from the front side of a portion of an implement showing the improved soil contact tool.
Figure 2:
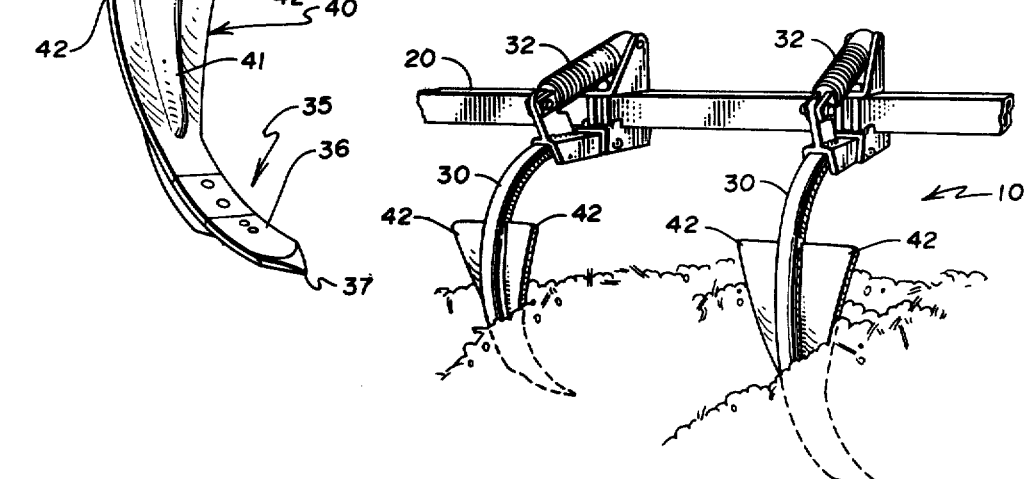
FIG. 2 is a perspective view from the rear showing the improved soil contact tool.

My improved soil contact tool 10 is shown in FIGS. 1 and 2 in a normal mounted position on a frame 20 of conventional tillage equipment, a portion of which is shown therein. In such tillage equipment, a plurality of such tools will be mounted on a tillage frame. Each tool will be mounted on a tool mounting shank, indicated generally at 30, with the tool mounting shank being coupled to the frame 20 through an individual spring clamp shank mounting assembly 32 to pivot the shank, if desired. Hence, the tool is pivotally mounted with respect to the frame so that it pivots when obstructions are encountered. Further, the mounting adjusts the angle of the pitch of the tool with respect to the ground.

A plurality of such tools are normally positioned in a staggered relationship upon the frame of the tillage equipment, and the tool mounting shanks conventionally extend rearwardly from the mounting assembly and are curved to mount the individual soil contact tools in the forward facing position. The tillage equipment frame may take varying forms and will normally be supported through wheel assemblies which are adjustable to move the tools into and out of the working position with respect to the soil. The frame is normally connected to a draft vehicle, such as a tractor. Similarly, the tool shank mounting assemblies may take varying forms, either solid or spring mounting, and an example of the spring mounting assembly may be found in the patents to M. E. Groenke, U.S. Pat. Nos. 3,480,086; 3,536,146; and 3,358,107.

The soil contact tool on a tillage type implement is adapted to dig into the compacted soil and disturb the same or loosen the soil preparatory to final cultivation and planting. Certain types of tools in addition create furrows which tend to cover adjacent crop residue to aid in decomposition of the same and to utilize this material for additional fertilization. The improved soil contact tool of the present invention not only works the soil, that is loosens it, but in creating the furrow as it is drawn through the ground, displaces the soil to the sides of the tool creating a ridge for the purpose of covering crop residue and mixing the same with soil to aid in the decomposition of the residue.

Figure 3:
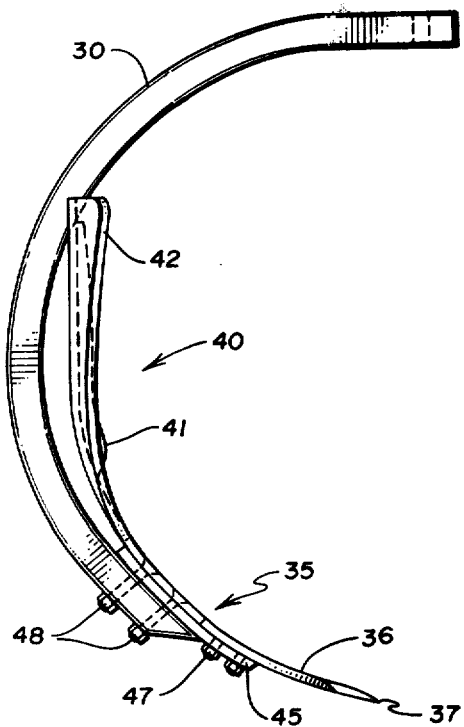
FIG. 3 is a side elevational view of the improved soil contact tool mounted on a tool mounting shank.
Figure 4:
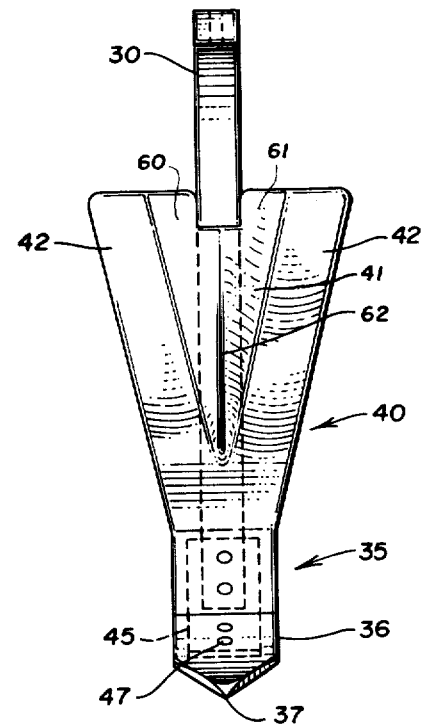
FIG. 4 is a front elevation view of the soil contact tool of FIG. 3.

As will be best seen in FIGS. 3 and 4, the improved soil contact tool is formed of a ground engaging section 35 and a triangular moldboard section 40 extending upwardly from the ground engaging section. The ground engaging section is characterized as a blade or point 36, having a uniform width and thickness which is flat from edge to edge and curved along its extent. The ground engaging section has a triangular shaped tip 37 at one end of the same. The ground engaging section, as shown in FIGS. 3 and 4, may include the entire blade or point and a portion of the moldboard section. The curvature of the ground engaging section along the extent is slightly less than the curvature of the shank. The moldboard section, starting from the end of the ground engaging section, is generally triangular in shape, that is, it has diverging sides. It includes a center portion 41 which is generally triangular in shape and has raised or generally convex surfaces 60, 61 which meet at the center line 62 of the center portion as shown in FIG. 5. Adjacent the triangular center portion are side portions 42 which merge with the convex surfaces 60, 61 and each have a generally concave surface. The surfaces 61, 62 are working or ground engaging surfaces which are individually convex in shape. A portion of the mold board below the raised triangular center portion 41 is generally flat from edge to edge. This portion of the moldboard has the same general curvature as the ground engaging section. Above this area the sides 42 and triangular center portion 41 of the moldboard have a slight curvature and then form a generally straight surface which has a non-uniform thickness.

The soil contact tool may include a ground engaging section which is formed entirely by the blade or point of the tool with the moldboard section being positioned adjacent thereto and having its sides diverging directly from the sides of the blade. The tool may also be formed with the moldboard integral with ground engaging section. The tool also may include a curved base member 45 which aids in mounting the tool parts on the tool shank. Thus, as shown in FIGS. 3 and 4, the curved end of the shank 30 has a curved base member 45 positioned thereon and the point 36 is secured to the base through suitable screws, such as is indicated at 47, with the mold board section 40 being secured to the shank through the base member 45 by nuts and bolts 48. Normally, the base member is of a narrow width and serves only to mount the tool parts on the shank. In the mounted position, as will be best seen in FIG. 3, the ground engaging section has a curvature slightly less than the curvature of the shank, and it is positioned at the end of the shank extending forward and below the end of the shank in the forward direction of the tool. The moldboard section has an initial curvature less than the curvature of the shank and the triangular sides and center portion are disposed generally vertical when the tool is mounted on the shank 30.

As will be seen in FIG. 5, the plurality of such tools in a relative spaced side-by-side relationship on a tillage frame will be drawn through compacted soil. Depending upon the depth of cultivation desired, the ground engaging section 35 and a portion of the mold board section 40 may be positioned below the surface of the soil with the point 36 of the ground engaging section breaking the soil and loosening the same to either side of the tool. In addition, the soil will be directed up the extent of the ground engaging section to be brought in contact with the moldboard section. The center portion of the moldboard section directs the soil to either side and the curved surfaces of the sides of the moldboard section direct the soil translationally from the tool to create ridges 50 on either side of the tool. The soil forming the ridges, as it is being brought up from the ground engaging section, will cover former crop residue, indicated schematically at 54, to either side of the tool and mix the same with the tilled soil. The elongated sides 42 of the moldboard section will further direct some of the soil on top of the ridge as indicated at 56, to bury the residue such as to aid in decomposition of the same. A majority of the soil will be directed as indicated by the arrows 51 to either side of the mold board while a portion of the soil will be directed as indicated by the arrows 52 to cover the ridge.

The moldboard section and ground engaging section are positioned forward of the ground engaging shank, and soil is directed out from the sides of the tool to create the furrow and mix the soil and crop residue. This creates the ridges on either side of the ground working tool while loosening the soil to either side of the ground engaging section. Thus, the triangular moldboard section above the narrow ground engaging section, creates the large ridges between it and adjacent the soil contact tools. Such ridges of soil and residue are mixed in such quantities such that it permits rapid decomposition of the old crop residue so that the residue does not interfere with subsequent operations in preparing a new crop planting. The mixture of soil and residue from the improved soil contact tool, in addition, leaves enough residue to reduce soil erosion from water and wind. The ridges of soil and residue further are better exposed to the sun to cause the soil to warm up rapidly in the spring to aid in the germination of a new crop as well as provide a reservoir type source to store water. Similarly, the ridges created by the soil contact tool are of such dimension that they will quickly dry so that subsequent preplant and planting operations can be accomplished at an early date. More importantly, the improved contact tool minimizes the number of tillage operations in the interest of soil and energy conservation.

The individual soil contact tool may be constructed as individual pieces comprising the blade or point, moldboard and base or as a point and moldboard attached directly to the shank or as a single composite unit. Such a contact tool is adaptable and beneficial to a wide range of crops and soils.

In considering this invention it should be remembered that the disclosure is illustrative only and the scope of the invention should be determined by the appended claims.

What I claim is:

1. A soil contact tool adapted to be mounted on and forwardly of a curved tool mounting shank comprising, a composite tool formed of a narrow ground engaging section having a forwardly facing working surface of narrow uniform width and further having a pointed tip and a moldboard section shaped triangularly when considered in a plane extending generally along its length and extending above and outwardly from the ground engaging section, said triangular moldboard section having a smaller centrally located triangular portion defined by a pair of forwardly facing working surfaces individually convex in shape and meeting at a center line of said moldboard section and having outwardly disposed concavely shaped side portions forming a V-shape with said centrally located triangular portion, and means in one of said sections for mounting the tool on the end of the curved tool shank, said tool being curved along its extent to be positioned forward of the shank with the ground engaging section extending below and forward of the end of the shank.

2. The soil contact tool of claim 1 in which the convex surfaces of said smaller centrally located triangular shaped portion merge with said concave surfaces of said concavely shaped side portions.

3. The soil contact tool of claim 2 in which all portions of the composite tool are forward of the curved tool mounting shank when mounted thereon.

4. The soil contact tool of claim 3 in which the triangular shaped moldboard section has a curvature less than the curvature of the shank.

5. The soil contact tool of claim 1 and including a base member having a width less than the ground engaging section and mounting the tool on the end of the shank.

6. The soil contact tool of claim 5 in which the ground engaging section and the triangular shaped moldboard section are separate components secured to the end of the shank.

7. The soil contact tool of claim 5 in which the triangular moldboard section adjacent the ground engaging section has a flat surface leading to the convex center and concave sides.

8. The soil contact tool of claim 7 in which the ground engaging section and the portion of the moldboard having a flat surface have a uniform curvature substantially equal to the curvature of the curved tool mounting shank.

* * * * *